United States Patent [19]
Tofte et al.

[11] Patent Number: 5,475,614
[45] Date of Patent: Dec. 12, 1995

[54] METHOD AND APPARATUS FOR CONTROLLING A VARIABLE FLUID DELIVERY SYSTEM

[75] Inventors: S. David Tofte, Mankato; Steven W. Vogel, North Mankato, both of Minn.

[73] Assignee: Micro-Trak Systems, Inc., Eagle Lake, Minn.

[21] Appl. No.: 180,687

[22] Filed: Jan. 13, 1994

[51] Int. Cl.$^6$ .................................................. G06F 17/00
[52] U.S. Cl. ............................................ 364/509; 364/510
[58] Field of Search .................................. 364/509, 510, 364/571.01, 551.01, 479; 356/246; 340/606, 614, 618, 626; 222/402.19, 55, 23

[56] References Cited

U.S. PATENT DOCUMENTS

| | | | |
|---|---|---|---|
| Re. 30,539 | 3/1981 | van der Lely | 111/6 |
| 3,680,967 | 8/1972 | Engelhardt | 356/246 |
| 3,698,682 | 10/1972 | Berning et al. | 251/30 |
| 3,801,063 | 4/1974 | Holmes et al. | 251/30 |
| 3,877,645 | 4/1975 | Oligschlaeger | 239/155 |
| 3,983,366 | 9/1976 | Gunn | 235/61.11 |
| 4,013,875 | 3/1977 | McGlynn | 235/150.2 |
| 4,015,366 | 4/1977 | Hall, III | 47/1 |
| 4,023,020 | 5/1977 | Lestradet | 235/151.2 |
| 4,029,094 | 6/1977 | Winicki | 222/55 |
| 4,052,003 | 10/1977 | Steffen | 364/510 |
| 4,062,306 | 12/1977 | Wosmek | 111/7 |
| 4,093,107 | 6/1978 | Allman et al. | 222/23 |
| 4,098,433 | 7/1978 | Oligschlaeger | 222/63 |
| 4,121,767 | 10/1978 | Jensen | 239/71 |
| 4,198,860 | 4/1980 | King | 222/55 |
| 4,220,998 | 9/1980 | Kays | 364/510 |
| 4,274,585 | 6/1981 | Lestradet | 239/124 |
| 4,296,409 | 10/1981 | Whitaker et al. | 340/684 |
| 4,301,944 | 11/1981 | Lestradet | 364/479 |
| 4,315,317 | 2/1982 | Orchard et al. | 364/510 |
| 4,358,054 | 11/1982 | Ehrat | 239/155 |
| 4,364,409 | 12/1982 | Jones | 137/486 |
| 4,376,298 | 3/1983 | Sokol et al. | 364/551 |
| 4,392,611 | 7/1983 | Bachman et al. | 364/510 |
| 4,458,609 | 7/1984 | Tofte | 111/7 |
| 4,522,059 | 6/1985 | Rodde et al. | 222/55 |
| 4,523,280 | 6/1985 | Bachman | 364/424 |
| 4,530,463 | 7/1985 | Hiniker et al. | 239/71 |
| 4,551,801 | 11/1985 | Sokol | 364/424 |
| 4,553,702 | 11/1985 | Coffee et al. | 239/690 |
| 4,574,715 | 3/1986 | Dietrich, Sr. et al. | 111/7 |
| 4,580,721 | 4/1986 | Coffee et al. | 239/3 |
| 4,614,300 | 9/1986 | Falcoff | 239/71 |

(List continued on next page.)

OTHER PUBLICATIONS

Raven® Chemical Injection Spray Systems. The Way Chemicals Were Meant to be Sprayed. Raven Industries, Inc. (1944).

Application Technology. Injection Closed System Sprayers, A. J. Landers, Royal Agricultural College, Cirencester, Glos. GL7 6JS, UK. (1994).

*Primary Examiner*—Ellis B. Ramirez
*Attorney, Agent, or Firm*—Merchant, Gould, Smith, Edell, Welter & Schmidt

[57] ABSTRACT

A fluid delivery control system is provided for controlling a fluid delivery system to deliver a fluid under pressure at a target flow rate. In a hybrid mode, the preferred fluid delivery control system is responsive to signals from a pressure sensor and a flowmeter. Primary feedback control is provided using the sensed pressure from the pressure sensor, and the sensed flow rate from the flowmeter is utilized to provide compensation for the pressure responsive feedback control and to provide accurate measurements of flow rate and total flow for the fluid delivery system. The preferred fluid delivery control system is also capable of operating in flowmeter and pressure modes which are only responsive to signals from a flowmeter and a pressure sensor, respectively. In the preferred embodiment, the fluid delivery control system is utilized in a mobile sprayer system for applying an agent over a surface. A constant application rate of agent over the surface is maintained by varying the delivery rate of the fluid delivery system with the speed of the sprayer system.

21 Claims, 7 Drawing Sheets

U.S. PATENT DOCUMENTS

| | | | |
|---|---|---|---|
| 4,624,193 | 11/1986 | Johnston | 111/6 |
| 4,637,547 | 1/1987 | Hiniker et al. | 239/1 |
| 4,656,957 | 4/1987 | Williamson et al. | 111/7 |
| 4,657,568 | 4/1987 | Jones | 55/166 |
| 4,714,196 | 12/1987 | McEachern et al. | 239/62 |
| 4,715,012 | 12/1987 | Mueller, Jr. | 364/900 |
| 4,763,692 | 8/1988 | Bachman et al. | 137/625.3 |
| 4,803,626 | 2/1989 | Bachman et al. | 364/424.07 |
| 4,805,088 | 2/1989 | Cross et al. | 364/172 |
| 4,807,544 | 2/1989 | Cross et al. | 111/7 |
| 4,807,663 | 2/1989 | Jones | 137/561 A |
| 4,825,959 | 5/1989 | Wilhelm | 172/720 |
| 4,878,598 | 11/1989 | Ruschhaupt, Jr. | 222/1 |
| 4,893,241 | 1/1990 | Girodat et al. | 364/424.07 |
| 4,895,303 | 1/1990 | Freyvogel | 239/61 |
| 4,896,282 | 1/1990 | Orwell | 364/571.01 |
| 4,922,852 | 5/1990 | Price | 222/55 |
| 4,924,413 | 5/1990 | Suwannukul | 364/521 |
| 4,924,418 | 5/1990 | Bachman et al. | 364/550 |
| 4,931,774 | 6/1990 | Bachman | 340/603 |
| 4,951,224 | 8/1990 | Hokynar | 364/571.01 |
| 4,967,957 | 11/1990 | Bachman | 239/62 |
| 5,014,914 | 5/1991 | Wallenas | 239/62 |
| 5,033,397 | 7/1991 | Colburn, Jr. | 111/118 |
| 5,075,857 | 12/1991 | Maresca | 364/421 |
| 5,170,820 | 12/1992 | Jones | 137/899 |
| 5,181,616 | 1/1993 | Le Gigan | 209/31 |
| 5,260,875 | 11/1993 | Tofte et al. | 364/551.01 |

METHOD AND APPARATUS FOR CONTROLLING A VARIABLE FLUID DELIVERY SYSTEM

FIELD OF THE INVENTION

The present invention is related to a control system for a variable fluid delivery system, and more particularly to a fluid delivery control system responsive to measurements of flow rate and pressure.

BACKGROUND OF THE INVENTION

Variable fluid delivery systems, i.e. systems for transporting a fluidized composition at a controllable flow rate, are useful in a wide variety of applications. One example of a system in which a variable fluid delivery system is utilized are sprayer systems used in agricultural implements which apply fertilizers, pesticides, herbicides, and other agricultural chemicals to fields ("agents").

One type of sprayer system generally regulates the amount of agent applied by diluting the agent in a carrier fluid and then controlling system pressure to apply the agent at a fixed predetermined rate. Specifically, the pressure is varied in accordance with the speed of the application vehicle. The volume of the sprayed combined agent/carrier fluid is regulated to vary with the speed of the application vehicle, and the amount of agent applied per unit of area is maintained at a relatively constant predetermined value.

Another type of sprayer system is an injection based system which controllably injects an agent into a carrier fluid at either a fixed or variable rate. Further, another type of sprayer system delivers a pressurized undiluted gaseous agent such as anhydrous ammonia.

Two types of feedback control systems have been utilized in the art in order to provide feedback for controlling the application rate in agricultural sprayer systems. The first type of feedback control mechanism is responsive to the measured pressure within the sprayer system. This type of system is generally disclosed, for example, in U.S. Pat. No. 3,877,645 issued to Oligschlaeger, U.S. Pat. No. 4,052,003 issued to Steffen, U.S. Pat. No. 4,392,611 issued to Bachman et al., and U.S. Pat. No. 4,803,626 issued to Bachman et al. The pressure responsive systems rely on the principle that the flow rate through a sprayer system may be calculated from the pressure in that system given known factors such as the number and size of the nozzles, the concentration of the agent in the carrier fluid, the specific gravity, etc. This type of system provides a very fast response time to pressure changes (because of the quick response of pressure sensors) which enables the control system to respond quickly to changes in the system. However, a pressure responsive system tends to have relatively poor accuracy since a number of the factors may change over time. For example, nozzle size may vary over time due to wear in the nozzles. In addition, pressure variations may exist between different points in the system plumbing, which also tends to corrupt the accuracy of pressure-based systems. Further, the accuracy of pressure responsive systems is relatively poor because pressure is an instantaneous measurement, requiring the flow rate itself to be calculated, rather than actually measured, which may introduce a degree of computational error to the resultant value obtained. Therefore, it is difficult to achieve accurate application rate calculations using pressure responsive systems, and such systems may require periodic recalibration to reduce the transient variations which may occur in the system over time.

The second type of feedback control mechanism relies on a flowmeter to provide a feedback signal for controlling the application rate of the sprayer system. These systems are used, for instance, in sprayer systems for applying anhydrous ammonia. Many commercially-available flowmeters are capable of providing accurate readings with regard to the application rate and total volume applied. However, flowmeters tend to have comparatively long response times, particularly at low flow rates, since most operate by providing a pulsed signal output with a frequency that varies proportionally with the rate of flow. Due to the comparatively long response time, the flowmeter responsive systems are not capable of quickly responding to changes in a system, and are therefore generally unsuitable for many control systems that must accommodate for variations in real time.

It is also known in the art to utilize flowmeters in sprayer control systems to serve a different purpose, as is shown for example in U.S. Pat. No. 4,803,626 issued to Bachman et al. In this type of application, a flowmeter is used as a "nozzle monitor" to detect failure conditions in the system such as plugged nozzles, worn-out nozzles or leaks in the plumbing.

In view of the above, it will be appreciated that the fast response of a pressure responsive control system is compromised by less than desirable accuracy, while the high accuracy of a flowmeter system is compromised by less than desirable response time. Therefore, a need exists in the art for a controller device for variable fluid delivery systems which provides high accuracy in combination with fast response time, without the drawbacks which have typically been associated with previous and conventional systems.

SUMMARY OF THE INVENTION

The present invention addresses these and other problems in the prior art in providing a fluid delivery control system, capable of controlling a fluid delivery system or the like, which is responsive to signals from a pressure sensor and a flowmeter. In particular, in a hybrid mode, the fluid delivery control system of the present invention utilizes the accuracy benefits of the flowmeter measurements and the response benefits of the pressure sensor measurements without the usual drawbacks associated with flowmeters and pressure sensors. Primary feedback is provided by the relatively responsive pressure sensor, while the flowmeter provides relatively accurate measurements to periodically determine a compensation factor for the pressure responsive flow rate control algorithm, as well as to provide accurate determinations of the actual flow rate and the total volume of agent applied by the system. Further, in a preferred fluid delivery control system, different operational modes are provided in the same control system, including a pressure-responsive pressure mode, a flowmeter-responsive flowmeter mode, as well as the aforementioned hybrid mode.

In accordance with one aspect of the invention, a fluid delivery system for delivering a fluid to an output at a target flow rate is provided. The fluid delivery system includes delivery means, controllable to deliver fluid at a plurality of delivery rates, for providing the fluid under pressure to an output; a pressure sensor configured to provide a pressure signal representative of fluid pressure in the delivery means; a flowmeter configured to provide a flow rate signal representative of fluid flow rate in the delivery means; control means, responsive to the pressure signal, for controlling the delivery means to deliver fluid to the output at the target flow rate, wherein the target flow rate and the pressure signal are related by a control equation; and compensation means for varying the control equation in response to deviations between a flow rate value calculated from the pressure signal and a flow rate value measured from the flow rate signal.

In accordance with a further aspect of the invention, a sprayer control system is provided for controlling a sprayer delivery system to deliver an agent from a source of agent to an output at a target application rate. The sprayer delivery system is of the type which is controllable to provide an agent under pressure at a plurality of delivery rates. The sprayer control system includes pressure sensing means for providing a pressure signal representative of agent pressure in the sprayer delivery system; flow rate sensing means for providing a flow rate signal representative of agent flow rate in the sprayer delivery system; control means for controlling the sprayer delivery system to deliver agent at the target application rate, wherein the control means includes error determining means, responsive to the pressure signal, for determining error between a flow rate sensed by the pressure sensing means and the target application rate; and compensation means, responsive to the flow rate signal, for varying the responsiveness of the error determining means to the pressure signal, to compensate for variations between the flow rate sensed by the pressure sensing means and an actual flow rate sensed by the flow rate sensing means.

In accordance with a further aspect of the invention, a method is provided for controlling a delivery system to deliver a fluid to an output at a target flow rate. The delivery system is of the type which is controllable to provide a fluid under pressure at a plurality of delivery rates. The method includes the steps of sensing fluid pressure in the delivery system and providing a pressure signal representative thereof; sensing fluid flow rate in the delivery system and providing a flow rate signal representative thereof; controlling the delivery system to deliver fluid at the target flow rate responsive to the pressure signal, wherein the target flow rate and pressure signal are related by a control equation; and varying the control equation responsive to the flow rate signal to compensate for variations between a flow rate value calculated from the pressure signal and the actual flow rate determined from the flow rate signal.

Further, in accordance with an additional aspect of the invention, a fluid delivery control system is provided for controlling a delivery system to deliver a fluid to an output at a target flow rate. The delivery system is of the type which is controllable to provide a fluid under pressure at a plurality of delivery rates. The fluid delivery control system includes a pressure sensor for providing a pressure signal representative of fluid pressure in the delivery system; a flowmeter for providing a flow rate signal representative of flow rate in the delivery system; and a controller, operatively connected to receive the pressure and flow rate signals, for controlling the delivery system to deliver fluid at the target flow rate. The controller is configurable to operate in pressure, flowmeter and hybrid modes. In the pressure mode, the controller is configured to control the delivery system to deliver fluid at the target flow rate responsive to the pressure signal. In the flowmeter mode, the controller is configured to control the delivery system to deliver fluid at the target flow rate responsive to the flow rate signal. In the hybrid mode, the controller is configured to control the delivery system to deliver fluid at the target flow rate responsive to both the pressure and the flow rate signals.

These and other advantages and features, which characterize the invention are pointed out with particularity in the claims annexed hereto and forming a part hereof. However, for a better understanding of the invention, its advantages and objectives attained by its use, reference should be made to the drawing which forms a further part hereof and to the accompanying descriptive matter, in which there is described a preferred embodiment of the invention.

DETAILED DESCRIPTION OF THE PREFERRED EMBODIMENT

The present invention is preferably utilized in an agricultural sprayer system which is capable of varying the application rate of agents from the sprayer responsive to vehicle speed in order to maintain a constant application of the agent per unit of area. However, one skilled in the art will appreciate that the principles of the present invention may be applied to other types of fluid delivery systems which require accurate and responsive control over the delivery rate of fluid in the system (e.g., in the food preparation industry, the beverage bottling industry, or other industries which require delivery of fluids at a accurately controlled rate).

Integrated Agricultural Planting and Spraying System

Figure 1:
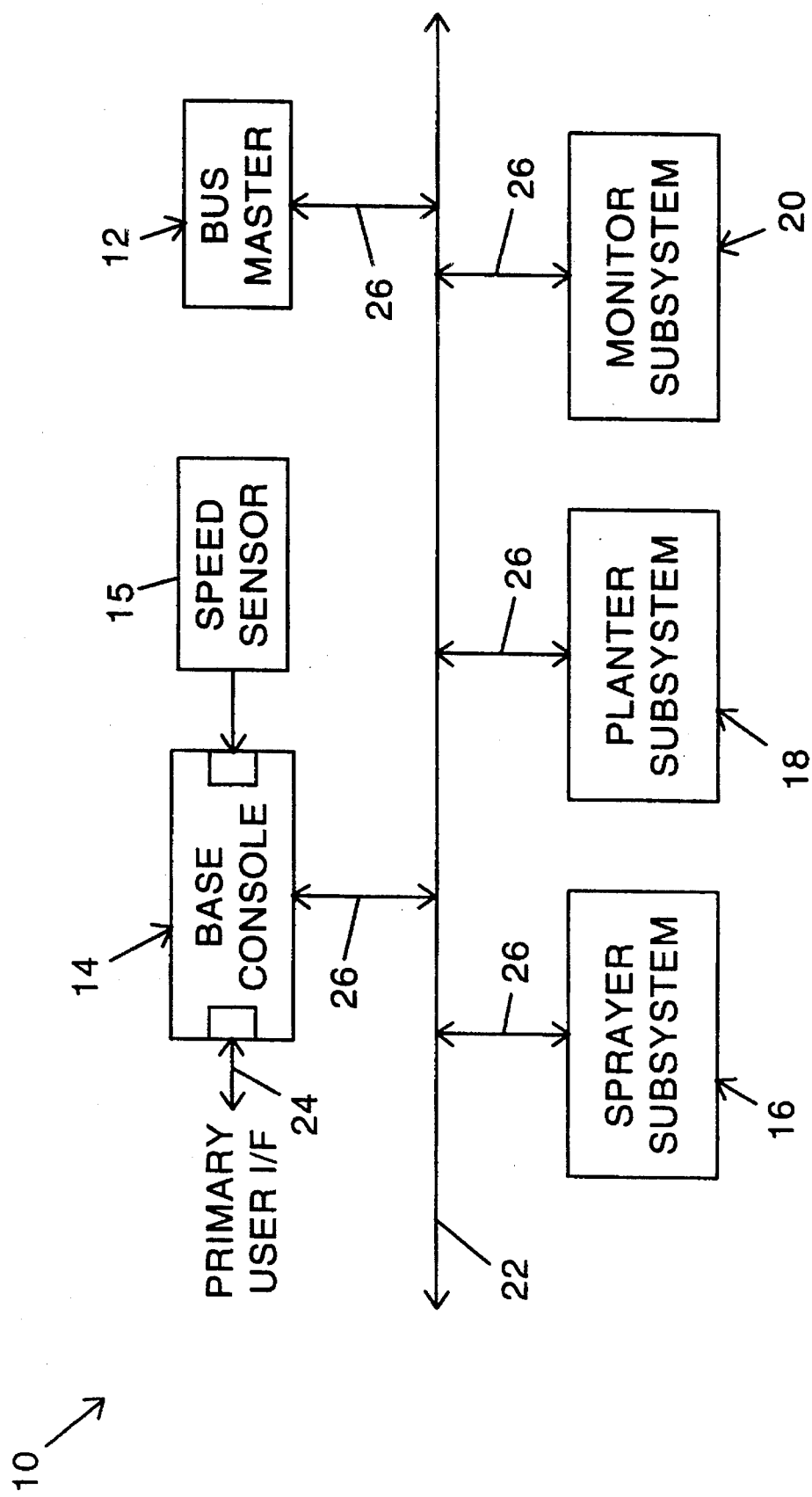
FIG. 1 is a block diagram of an integrated agricultural planting and spraying system for use with the preferred fluid delivery control system of the present invention.

The present invention may be utilized in an integrated agricultural planting and spraying system such as system 10 which is shown in FIG. 1. This system is generally the subject of U.S. Pat. No. 5,260,875 issued Nov. 9, 1993 to Tofte et al., which is assigned to the same assignee as the present invention, and which is hereby incorporated herein by reference. A summary of the operational configuration of preferred system 10 is provided below.

Integrated agricultural planting and spraying system 10 generally includes an integrated network of controllers for the monitoring and control of planting and spraying. System 10 includes a bus master 12, a base console 14, a sprayer subsystem 16, a planter subsystem 18, a monitor subsystem 20 and a communications medium such as bus 22. Elements 12–20 are capable of communicating to each other through a standard communications network connection such as media interface 26 to bus 22. Bus master 12 controls the operation of bus 22 and, in the preferred embodiment, serves as the data gathering node for inter-system communications.

Base console 14 operates as the primary user interface. Base console 14 receives user input and displays system status through primary user interface means 24. Sprayer subsystem 16 receives spraying instructions entered through the base console and controls components of the sprayer subsystem in order to execute those instructions. Likewise, planter system 18 receives instructions through base console 14, executes those instructions and returns planter subsystem status. Monitor subsystem 20 is capable of recording data traffic present on bus 22 and storing the data read from bus 22 to non-volatile memory for future playback. In one embodiment, sprayer subsystem 16 and planter subsystem 18 have separate subsystem user interfaces that operate in conjunction with base console 14 to monitor and control subsystem operation.

Overall operation of the system is controlled by base console 14. Base console 14 may operate in a number of modes including normal, calibration, sigma, initialization and debug modes.

Bus master 12 operates in conjunction with base console 14 to control each of the subsystems in system 10. This includes such functions as identifying each sensor device and implement to be managed, accessing program code and data stored in memory associated with base console 14 to operate such sensor device and implement, receiving control information from primary user interface 24, displaying status through display 24, generating control signals for controlling each sensor device and implement and supplying these control signals through bus 22 to the appropriate device.

Sensor devices and implements are preferably grouped into subsystem and identified by a subsystem code. During initialization, each subsystem controller transfers a subsystem status including a subsystem code indicating the type of subsystem (sprayer, planter, monitor, etc.) to bus master 12 and base console 14. Bus master 12 and base console 14, in turn, record the existence of that subsystem and control primary user interface 24 accordingly. Since more than one subsystem of a specific type can be connected to system 10 at one time, each subsystem is assigned a unique system number. The system number is assigned by bus master 14 or by the operator. The system number then serves as the identifier for all transactions between base console 14, bus master 12 and a specific subsystem, among others.

It is contemplated that other subsystems could be added to system 10 by connecting them through standard media interface 26 to bus 22. Such types of subsystems could include navigation subsystems or system maintenance subsystems.

It will therefore be appreciated that the integrated agricultural planting and spraying system 10 provides a powerful and flexible control system for integrating the control of a wide variety of agricultural implements. However, one skilled in the art will appreciate that a number of different types of control systems may be utilized in the control and communication with the preferred fluid delivery control system disclosed herein.

Figure 2:
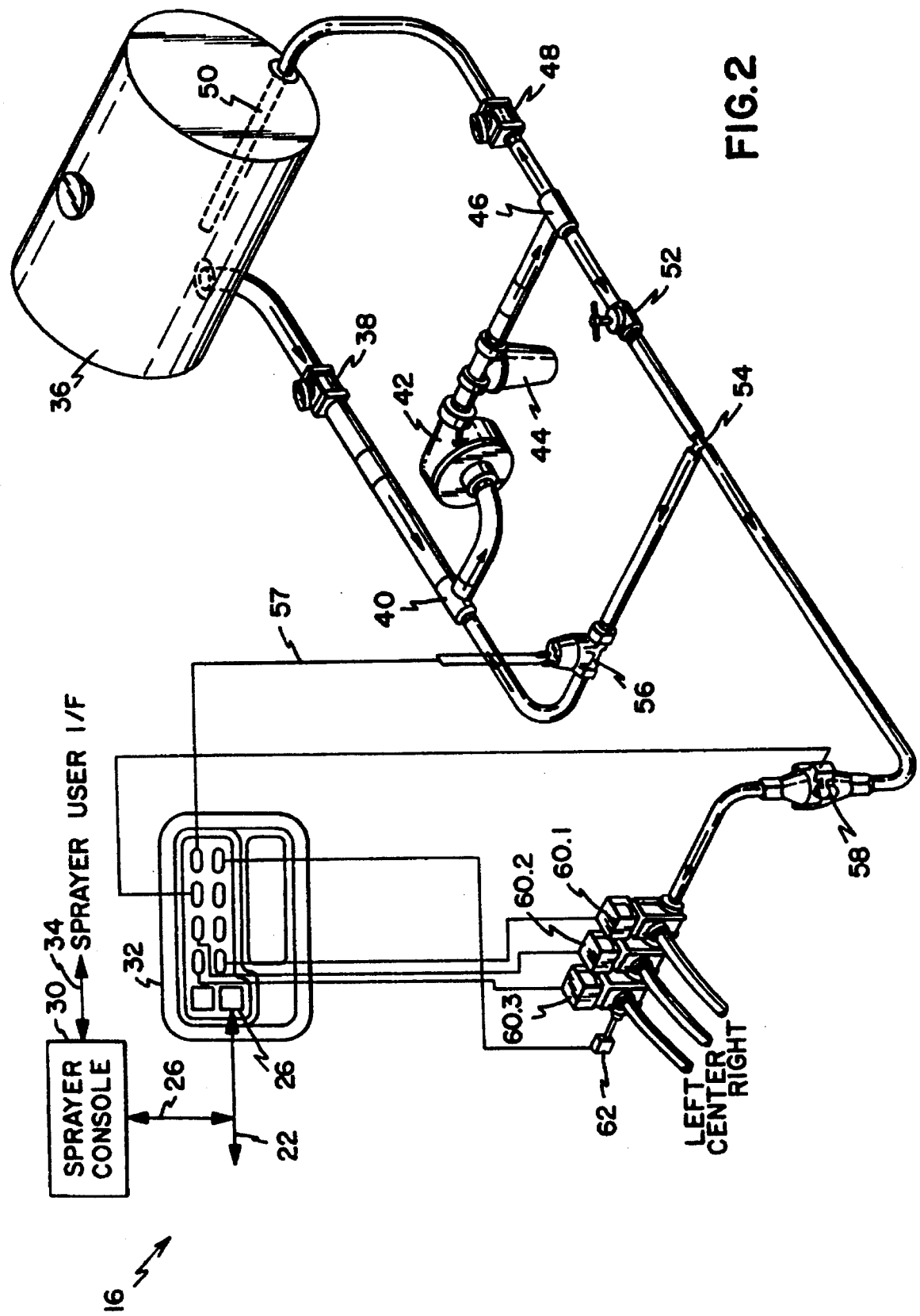
FIG. 2 is an electrical and plumbing diagram representative of a preferred sprayer subsystem for use with the system of FIG. 1, and for use with the preferred fluid delivery control system of the present invention.

FIG. 2 shows a preferred sprayer subsystem 16 for use with the fluid delivery control system of the present invention. Sprayer subsystem 16 preferably includes a sprayer console 30 and a sprayer accessory module 32 connected through media interface 26 to bus 22 and the remaining elements of system 10. Sprayer console 30 provides a sprayer user interface 34 for use in conjunction with user interface 24 to control sprayer subsystem 16. Sprayer accessory module 32 preferably contains the hardware necessary to operate the fluid delivery control system of the present invention to control the electromagnetic components which regulate fluid flow through sprayer system 16. Module 32 also monitors sensors indicative of subsystem 16 operation.

Sprayer subsystem 16 is preferably connected to an output of carrier tank 36 through tank shut-off valve 38 and to a carrier agitator 50 through agitation shut-off valve 48. Connection of the electromechanical, mechanical and plumbing elements of a sprayer system such as shown in FIG. 2 is well known in the art.

In FIG. 2, tank shut-off valve 38 is connected in turn to plumbing tee 40. Plumbing tee 40 is connected to pump 42 and servo valve 56. Pump 42 pumps the fluid drawn from carrier tank 36 through filter 44 to plumbing tee 46. Plumbing tee 46 divides the fluid such that a portion of the fluid is pumped through agitation shut-off valve 48 to carrier agitator 50 embedded in carrier tank 36. The remaining fluid passes through throttle valve 52 and into plumbing tee 54. A portion of the fluid passing through plumbing tee 54 is drawn through servo valve 56 and passed back into plumbing tee 40. Servo valve 56 provides a feedback mechanism capable of controlling fluid pressure within subsystem 16. Use of such a valve is well known in the art.

Plumbing tee 54 is also connected through flowmeter 58 to boom solenoid valves 60.1 through 60.3. In one embodiment, boom solenoid valves 60.1 through 60.3 are connected in series. This type of connection provides an internal manifold which equalizes subsystem pressure to each of the booms. This pressure is monitored with pressure sensor 62. One skilled in the art will appreciate that any number of boom solenoid valves may be connected to a system in this manner.

Servo valve 56, flowmeter 58, boom solenoid valves 60.1–3 and pressure sensor 62 are electrically connected to sprayer accessory module 32. Servo valve 56 is of the type which is controlled with a three wire system including an H driver used to send pulse width modulated signals to open or close servo valve 56. Servo valve 56 is of the type which may be opened or closed to allow variable levels of flow through the valve. Module 32 monitors the volume of fluid passing through flowmeter 58 and the subsystem pressure sensed by pressure sensor 62, and controls servo valve 56 responsive thereto in order to maintain the subsystem pressure necessary to guarantee regular spray patterns from the sprayer booms. The operation and configuration of the control mechanism for sprayer accessory module 32 is discussed in greater detail below. In addition, sprayer accessory module 32 has the capability of individually turning on or off each of boom solenoid valves 60.1 through 60.3. In an alternate embodiment, servo valve 56 includes position feedback connected to sprayer accessory module 32 through servo control cable 57 and used for feeding back a voltage representative of the position of the servo valve.

Various alternative embodiments of the sprayer subsystem 16 may be utilized consistent with the principles of the present invention. For example, a boost solenoid valve may be inserted between plumbing tee 54 and servo valve 56, and an additional plumbing tee may be inserted between servo valve 56 and plumbing tee 40 to bypass servo valve 56 for minimizing the pressure changes seen by subsystem 16 when solenoid valves 60.1 through 60.3 are shut-off. Also, additional boom solenoid valves may be added to the plumbing of FIG. 2 to increase the spray width of the application vehicle. This might require a boom extension accessory module also connected to bus 22 through interface 26 in order to control the operation of the additional booms. Alternatively, this control could be provided through sprayer accessory module 32. In another embodiment, boom solenoid valves may be routed back through a manifold and a second flowmeter to plumbing tee 40, such that the flow rate in the system may be determined by taking the difference between the readings of the two flowmeters in the system.

Alternately, sprayer subsystem 16 may incorporate a direct injection spraying apparatus in addition to the basic sprayer subsystem in order to more precisely control the application of a agent. The injection system may be utilized to maintain a constant agent/carrier ratio in the system, rather than premixing the agent and carrier that is stored in tank 36. In this embodiment, control over application rate would still be maintained via the fluid delivery control scheme discussed herein. Alternatively, the concentration of agent and carrier may be varied by the injection system to provide more flexible control over the application rate when used in conjunction with the fluid delivery control mechanism discussed herein.

It is also contemplated that sprayer subsystem 16 may be configured as an anhydrous ammonia spraying system which utilizes a servo valve in series with a flowmeter in order to restrict the flow of anhydrous ammonia to the applicator booms. In such systems, the anhydrous ammonia is not mixed with the carrier fluid, and therefore the control of the concentration thereof is not a concern. Such a system may also include temperature and pressure sensors for monitoring the anhydrous material in liquid-to-vapor transition and allow sprayer subsystem 16 to alert the user that application of the anhydrous ammonia material is not proceeding as planned.

Due to the flexibility of system 10, various embodiments of sprayer subsystem 16 may be reliably controlled without regard to the particular type of sprayer subsystem that is interconnected with system 10. Through programming system 10 to incorporate the different aspects of the various types of sprayer subsystems, system 10 may be modified to control any type of sprayer which may be utilized in the art.

Fluid Delivery Control System

Figure 3:
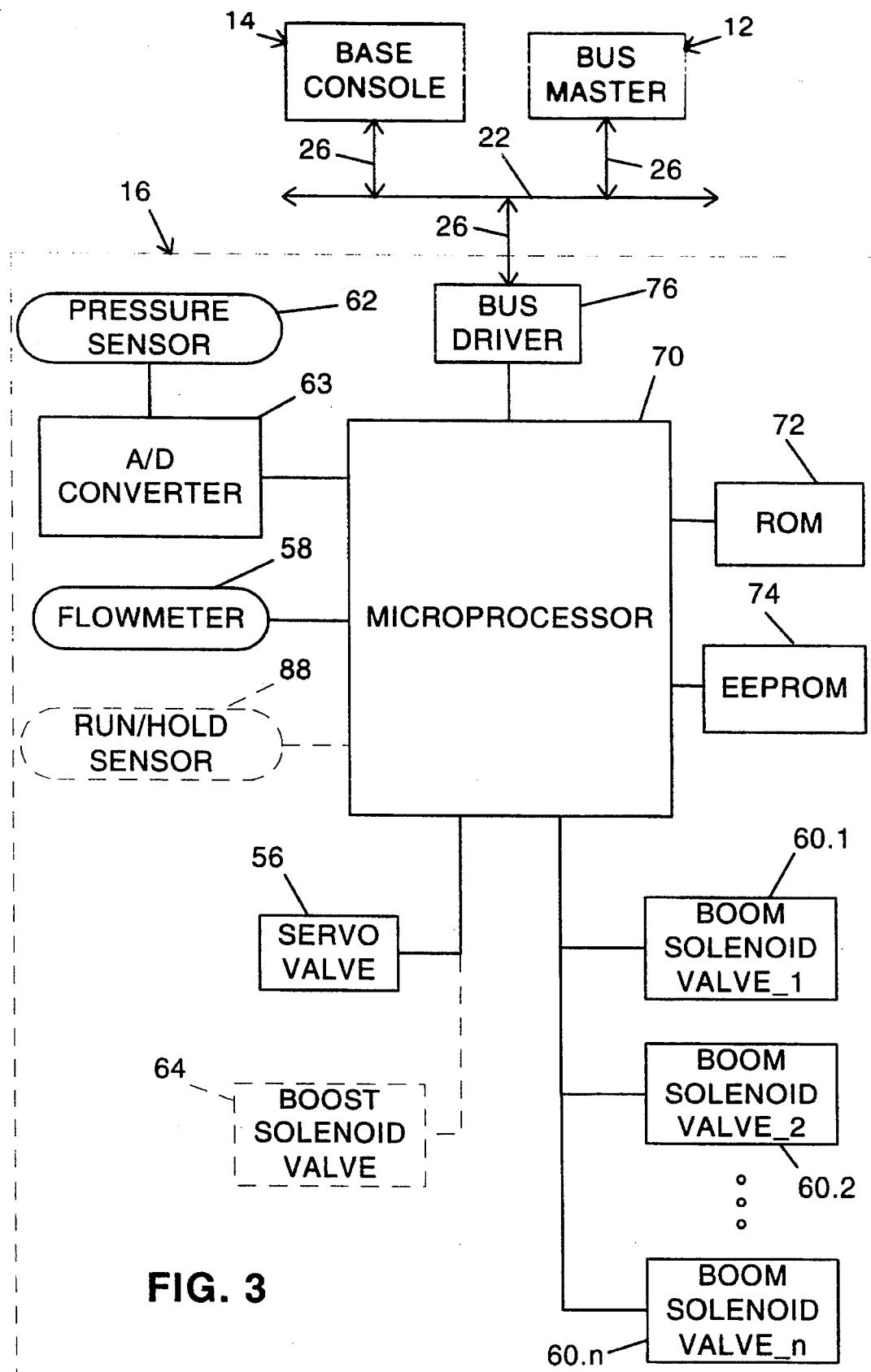
FIG. 3 is a block diagram of the preferred fluid delivery control system consistent with the principles of the present invention.

FIG. 3 shows a preferred hardware configuration for the fluid delivery control system of the present invention. A microprocessor 70 is utilized to provide the operational control over the preferred control system. Microprocessor 70 is preferably an Intel 80C32 microcontroller operating at 12 Mhz. A number of peripheral components are required for microprocessor 70 such as Read Only Memory 72 which contains the program code for execution of the control system, as well as EEPROM 74 which contains non-volatile calibration data that is downloaded to the microprocessor during initialization. Additional RAM beyond that supplied in microprocessor 70 may be included; however, in the preferred embodiment, the memory capacity of the Intel 80C32 is sufficient. It will be appreciated by one skilled in the art that various support circuitry will be required for the operation of microprocessor 70 such as a power supply circuit, a crystal oscillator, data buffers, and other necessary components. Further, it will be appreciated that the configuration, installation, and operation of ROM 72, EEPROM 74, and the other support circuitry is well known within the art, and will vary depending upon the particular microprocessor or other controller utilized to execute the fluid delivery control system.

The Intel 80C32 microcontroller which is the preferred component for microprocessor 70 includes a number of input/output ports for transmitting and receiving data with external devices. It is preferable to configure at least one of the I/O ports as an input port to receive data from external devices which is necessary for control system operation. For instance, data is provided by pressure sensor 62 through A/D Converter 63 to obtain pressure measurements of the sprayer subsystem.

Figure 9:
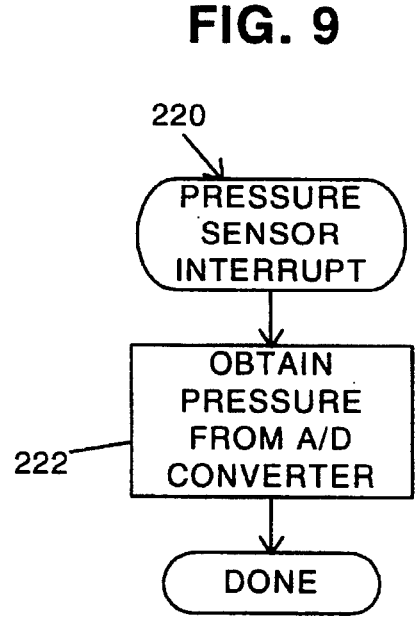
FIG. 9 is a flow chart of a pressure sensor interrupt routine for the preferred fluid delivery control system of FIG. 3.

Pressure sensor 62 is preferably of the type which outputs an analog voltage signal proportional to the pressure sensed by sensor 62. In the preferred embodiment, a known A/D Converter circuit 63 is utilized to provide a pulsed signal having pulses with periods representative of the analog voltage signal from pressure sensor 62. When a reading of pressure sensor 62 is desired by microprocessor 70, A/D Converter 63 is enabled (by a control line, not shown) to first provide a start pulse which is received by microprocessor 70 to capture a start time from a free-running timer. Next a succession of pulses are sent by the A/D Converter circuit having periods corresponding to the pressure, the pressure rate, a 3.0 v reference voltage, and a 2.5 v reference voltage, respectively. Microprocessor 70 captures time values from the timer upon receiving each of these pulses, and from this information, microprocessor 70 is capable of generating a digital representation of the pressure measured by sensor 62 in a manner which is known in the art. The routine for capturing the pulses and generating a digital representation thereof is shown in FIG. 9 and discussed in greater detail below.

It will be appreciated that any number of commercially available pressure sensors are suitable for the various potential pressure ranges and operating environments. In addition, any number of conversion routines and circuits known in the art may be utilized to generate a digital representation of the pressure in sprayer subsystem 16 when utilizing these different types of pressure sensors. Therefore, those skilled in the art will appreciate that the particular conversion circuitry utilized to provide the pressure signal to microprocessor 70 may vary for different applications.

Flowmeter 58 is preferably a turbine-type flowmeter such as the type manufactured by Micro-Trak Systems, Inc. This type of flowmeter provides a pulsed signal having a period that varies with the rate of flow sensed by the flowmeter. Flowmeters of this type are generally characterized by their "Pulses Per Gallon" factor, wherein the volume of fluid passing through the flowmeter may be determined simply by counting the pulses, and the rate may be determined by measuring the period of the pulses.

Figure 8:
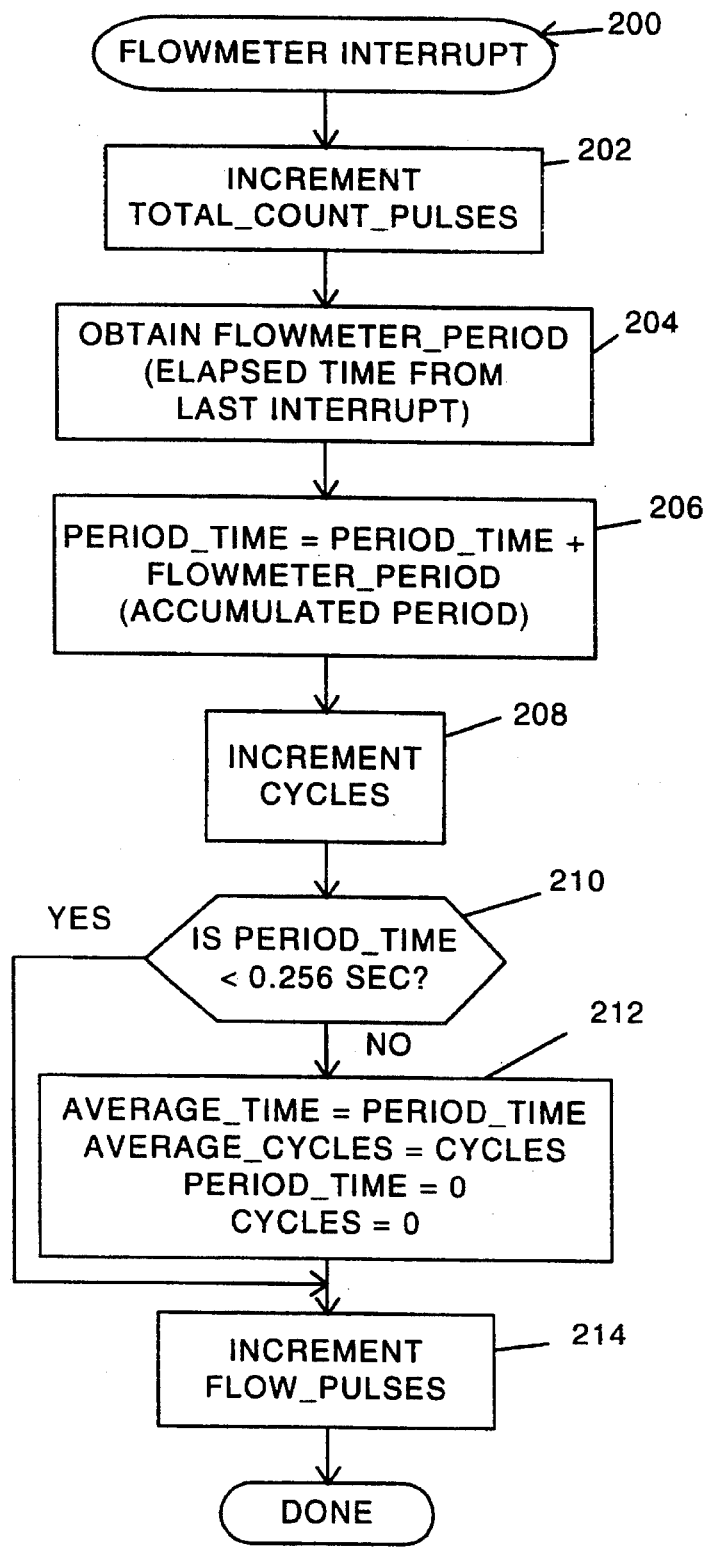
FIG. 8 is a flow chart of a flowmeter interrupt routine for the preferred fluid delivery control system of FIG. 3.

The pulsed output of flowmeter 58 is preferably supplied to microprocessor 70 as an external interrupt input. Therefore, upon each pulse of flowmeter 58, an interrupt will be initiated in microprocessor 70. Microprocessor 70 is then capable of counting the number of pulses and measuring the time periods therebetween in order to obtain accurate readings of total flow and flow rate. The operation of the interrupt routine in microprocessor 70 is shown in FIG. 8 and discussed in greater detail below.

In one embodiment, an optional run/hold sensor 88 may also provide an input to microprocessor 70. The run/hold sensor 88 detects whether the sprayer subsystem 16 configured in a run or hold configuration (i.e. whether it is in operation or merely on standby). This input may be useful to modify the control provided by microprocessor 70 depending upon whether sprayer subsystem 16 is enabled to begin spraying agents therefrom. The use of a run/hold sensor is generally known in the art.

In addition to the inputs received by microprocessor 70, a number of outputs must be provided to adequately control the operation of sprayer subsystem 16. In particular, to control the application rate of sprayer subsystem 16, control must be provided over servo valve 56. Servo valve 56 is preferably a butterfly-type servo valve such as the type manufactured by Micro-Trak Systems, Inc. Servo valve 56 is capable of being opened or closed by applying a positive or negative control voltage, respectively, thereto. Servo valve 56 runs at a constant rate, so the degree that it is opened or closed will depend upon the period of time in which a positive or negative control voltage is applied to the servo valve control input.

Consistent with the invention, the preferred fluid delivery control system calculates the run-time necessary to locate servo valve 56 at its proper position for maintaining the proper pressure and application rate in sprayer subsystem 16. Further, conventional circuitry is utilized to actuate servo valve 56 in accordance with the desired run-time selected by the delivery control system. The preferred fluid delivery control system may also include means for keeping servo valve 56 within certain limits such that a preferred range of flow rates may be maintained in the sprayer subsystem and such that damage to the servo valve may be prevented.

Servo valve 56 may or may not be of the type which is capable of providing a positional signal back to microprocessor 70. However, control of such a servo valve in either configuration is generally known by one skilled in the art.

A number of additional inputs and outputs may be connected to microprocessor 70 to control the other aspects of sprayer subsystem 16. For instance, control over the various boom solenoid valves 60.1–60.n may be provided by microprocessor 70. Further, control may be provided over a boost solenoid valve 64 if such a valve is installed in the particular sprayer subsystem 16 being used. In addition, status information from these valves may be provided to microprocessor 70 such that closed-loop control may be provided thereover. The required circuitry and operational program necessary to control valves 60.1–60.n and 64 is generally known in the art, and will not be discussed further herein. It will be appreciated by those skilled in the art that other control signals and inputs which are useful in controlling the additional aspects of sprayer subsystem 16 may also be routed with microprocessor 70.

Microprocessor 70 also includes a bus driver 76 for enabling serial communications with the other components on bus 22 such as base console 14 and bus master 12. The preferred embodiment may include a universal asynchronous receiver/transmitter ("UART") or other communication device which is suitable for serial communication with the components on bus 22. However, it will be appreciated that driver/buffer circuitry, provided by bus driver 76, is necessary for the proper serial communication of microprocessor 70 on bus 22. In addition, it will be appreciated that the program code necessary for communication across bus 22 will vary depending upon the particular protocol used on bus 22.

A number of inputs are preferably required from base console 14 to provide sprayer subsystem 16 with the data necessary to properly control the application rate of the sprayer. In particular, a speed sensor 15 (shown in FIG. 1) is included which provides a signal indicative of the speed of the vehicle to which sprayer subsystem 16 is mounted. This input is necessary in order to vary the application rate of agent with the speed of the vehicle to maintain a relatively constant application rate per unit of area.

Sprayer subsystem 16 also requires inputs from base console 14 which are preferably set in a calibration or initialization routine. For instance, the desired application rate, or target rate, of an agent is necessary to determine the rate at which sprayer subsystem 16 will dispense the agent. The target rate is typically input from a user in terms of gallons per acre or a similar dimensional value. The area covered by the agricultural implement may be determined from the speed signal received from speed sensor 15 and from the known width of dispensing from the sprayer booms connected to sprayer subsystem 16. However, sprayer subsystem 16 preferably retrieves an application rate value from base console 14 which is in terms of gallons per meter or another similar distance-based unit which factors in the width of the sprayer implement. Alternatively, one skilled in the art will appreciate that these functions could be incorporated into the sprayer subsystem itself.

Another value which is preferably transmitted from base console 14 to sprayer subsystem 16 is information related to the mechanical aspects of sprayer subsystem 16, which is preferably embodied in a constant designated the nozzle factor of the implement. It will be appreciated that the nozzle factor constant is representative of the relationship between the flow rate and the square root of pressure in sprayer subsystem 16. The information in the nozzle factor may be representative of the size of the nozzles, the number of the nozzles, the carrier/agent concentration ratio, the specific gravity, etc. Further, a unit scaling component may also be included in the nozzle factor constant. It is from these known mechanical characteristics of sprayer subsystem 16 that the application rate may be measured. The nozzle factor constant will be discussed in greater detail below.

In the preferred embodiment, sprayer subsystem 16 also provides data to base console 14 for display to an operator. It is preferred that the actual flow rate in gallons per second, as well as the total volume distributed, is periodically provided to base console 14 for display to the operator. Other information related to the status of sprayer subsystem may also be sent to base console 14 over bus 22.

Any additional data may be transferred between base console 14 and sprayer subsystem 16 as will be appreciated by one skilled in the art. For example, other types of status information, control signals, etc. may be used.

Principles of Operation

In order to better describe the present invention, a discussion of the logical steps acted upon by microprocessor 70 will be deferred pending a discussion of the principles of operation of preferred sprayer subsystem 16. The preferred fluid delivery control system of the present invention is preferably capable of operating in a plurality of modes which vary in the feedback response which is used in controlling servo valve 56 to maintain a particular application rate for sprayer subsystem 16.

First, the fluid delivery control system is capable of operating in a flowmeter mode, in which feedback control is provided through the measurement of flow rate provided by the flowmeter. This system may be utilized on embodiments which do not have a pressure sensor installed, or when a failure is detected in a pressure sensor, or, as will be discussed below, as a backup when the accuracy of a hybrid or pressure-based system has decreased to a point in which proper control is not possible with the pressure sensor.

A closed-loop control system based upon flowmeter feedback is established. For example, a flowmeter based algorithm may operate as follows. A target application rate (e.g. in gallons/acre) is input by an operator. Base console 14 includes data on the width of the particular sprayer subsystem 16, and can calculate a desired application rate in terms of the width covered (e.g. in gallons/meter). This information, along with the present speed (e.g. in meters/second) of the vehicle, is provided to microprocessor 70 in sprayer subsystem 16 over bus 22.

With the information received over bus 22, microprocessor 70 may then calculate a target rate (e.g. in gallons/second) which is equal to the desired application rate (in gallons/meter) multiplied by the speed of the vehicle (in meters/second).

The actual flow rate, as discussed above, is received from flowmeter 58 as a stream of pulses having periods representative of the rate of flow in sprayer subsystem 16. With the known pulses per gallon rating of the flowmeter, the actual rate of flow in terms of gallons/second may be determined by measuring the period of the pulsed signal and dividing this value by the pulses per gallon rating of the flowmeter used. For more stabilized response, it may be preferable to average a number of cycles of the pulsed signal from the flowmeter to remove transient noise and other variations which may be present in the pulsed signal. Further, if the agent being applied is diluted in a carrier fluid, the actual rate may need to be modified accordingly to accommodate the actual percentage of agent in the total fluid mixture.

In order to control servo valve 56, the error between the actual flow rate and the target flow rate is computed, then the direction and amount of time to run the valve is calculated, and the servo valve is actuated. This process corrects the actual flow rate in sprayer subsystem 16 to approximate the target flow rate. It will be appreciated that a number of known control feedback techniques may be utilized in order to provide faster and more stable responses in this closed-loop control system (e.g., PID equations, fuzzy logic, etc.).

In addition, it is preferable for the control system to provide the actual flow rate, as well as the total volume of agent dispensed, across bus 22 to console 14 in order to display these values to the operator. Both of these values may be easily computed from the pulsed signal provided by the flowmeter, given the known pulses per gallon of the flowmeter.

Second, the preferred fluid delivery control system of the present invention is also capable of operating in a pressure mode. In this mode, feedback control is provided through the measurement of pressure provided by the pressure sensor. This system would be utilized on embodiments which do not have a flowmeter installed, or when a failure is detected in a flowmeter, for example.

A closed-loop control system based upon pressure sensor feedback is established. For example, a pressure based algorithm may operate as follows. The desired application rate (e.g., in gallons/meter) and the present speed of the vehicle (e.g., in meters/second) may be provided to microprocessor 70 in sprayer subsystem 16 by base console 14 over bus 22. With the information received over bus 22, microprocessor 70 may then calculate a target rate (e.g., in gallons/second) which is equal to the desired application rate (in gallons/meter) multiplied by the speed of the vehicle (in meters/second).

To determine the actual flow rate in sprayer subsystem 16 from the measured pressure from pressure sensor 62, an additional constant value, designated the nozzle factor, must be known. This value is a constant representative of the number of nozzles, the size of the nozzles, the specific gravity, and the ratio of agent and carrier in sprayer subsystem 16. This constant defines the physical relationship between flow rate and the square root of pressure in sprayer subsystem 16. This value will vary depending upon the particular mechanical configuration of the sprayer subsystem 16, as well as the particular agent being dispensed. The value may be calculated from the known mechanical characteristics, or may be determined empirically. Either manner of computing the nozzle factor is generally known in the art.

It will be appreciated that the actual flow rate may be calculated directly from the nozzle factor and measured pressure, as rate of flow is related to pressure by the control equation:

*rate of flow (gal/sec)=nozzle factor×sqrt[pressure(psi)]*

The control of servo valve 56 is provided in much the same manner as the flowmeter mode of operation. The error between the actual flow rate and the target flow rate is computed. Then, the direction and amount of time to run the valve is calculated, and the servo valve is actuated, to correct the actual flow rate in sprayer subsystem 16 to approximate the target flow rate. It will be appreciated that many known control feedback techniques may be utilized in order to provide faster and more stable responses in this closed-loop control system (e.g., PID equations, fuzzy logic, etc.).

As an alternative, the pressure mode of operation may compare the actual measured pressure with a target pressure computed from the target flow rate calculated from the information received from base console 14. It will be appreciated that a similar control scheme would be utilized in order to control the positioning of servo valve 56 and control the application rate of sprayer subsystem 16. It will also be appreciated that a target pressure may easily be calculated by using the reverse of the above rate of flow control equation, namely:

$$\text{pressure (psi)} = \frac{[\text{rate of flow (gal/sec)}]^2}{[\text{nozzle factor}]^2}$$

It is preferable for the control system to provide the actual flow rate, as well as the total volume of agent dispensed, across bus 22 to console 14 in order to display these values to the operator. The actual flow rate is calculated as discussed above. However, to calculate the total volume of agent dispensed, it is preferable to measure the pressure at predetermined intervals, calculate the resulting actual flow rates, multiply the acquired flow rates by the time period between intervals to obtain flow calculations at each interval, and accumulate the interval flow calculations. It will be appreciated that performing these calculations at relatively frequent intervals is desirable. By doing so, the total volume calculation will closely track variations in the calculated flow rates.

A third mode of operation for the preferred fluid delivery control system is a hybrid mode which utilizes measurements from both the flowmeter and the pressure sensor to control the operation of sprayer subsystem 16 (i.e., it is responsive to the pressure and flow rate signals provided by the flowmeter and pressure sensor, respectively). In systems having flowmeters and pressure sensors installed therein, this mode is capable of providing more accurate and responsive control over the application of agent than the flowmeter and pressure modes individually.

In the hybrid mode, the primary feedback control signal is the pressure signal received from the pressure sensor. It will be appreciated that pressure sensors generally have faster response times than flowmeters, which typically makes them better suited for real-time closed-loop control systems. However, as is discussed above, many pressure sensors suffer from a comparatively low accuracy since flow rate calculations therefrom are dependent upon mechanical or physical characteristics of the sprayer which may have a tendency to change over time, thus necessitating frequent system recalibration.

For instance, the nozzles of the sprayer may wear over a period of time such that their openings increase in diameter. The increased diameter of a nozzle increases the flow rate at a given system pressure for the plumbing of sprayer subsystem 16, and therefore, a calculation of flow rate from the sensed pressure in a system having a worn nozzle would underestimate the actual flow rate through the system.

An additional accuracy problem from pressure sensors occurs because a pressure differential may exist between the nozzles and the portion of the system in which the pressure sensor is mounted. This may result in an inaccurate measure of pressure at the nozzles, which is significant since the flow rate equation discussed above relies on the measured pressure at the nozzles in calculating flow rate.

Further, pressure sensors are not well suited for performing the calculations for the total volume of agent applied since the total volume is calculated from a plurality of discrete points, rather than being directly measured. Total volume is calculated with a pressure sensor by summing a series of calculations which merely approximate the total flow in a period of time by multiplying the flow rate calculated from the measured pressure with the time period since the last measurement. Any changes in flow rate within a time period, or any inaccuracies in the measurement of the flow rate, are carried forward through the total volume approximation such that the errors are capable of accumulating and generating undesirable inaccuracies in the total volume calculation.

The hybrid mode of the present invention avoids the drawbacks of pressure sensors by utilizing a flowmeter to perform a number of functions which avoid or correct for inaccuracies which were previously associated with the pressure based control systems. It will be appreciated that while flowmeters tend to have relatively long response times (which make them unsuitable for many real-time control systems), flowmeters also tend to have much greater accuracy for determining flow rates than is capable with pressure sensors.

In the hybrid mode, flowmeter measurements are used to provide real-time compensation of the calculation of flow rate from the pressure sensed by pressure sensor 62. This is typically performed by measuring the flow rate with the flowmeter, calculating the expected flow rate from the pressure measurement sensed by the pressure sensor, then providing a correction factor for modifying the control equation defining the relationship between pressure and flow rate in sprayer subsystem 16 such that the expected flow rate calculation from the pressure measurement better approximates the actual flow rate sensed by the flowmeter.

Closed-loop control over fluid delivery in a preferred hybrid mode is similar to the operation of the pressure mode. In the hybrid mode, the desired application rate (e.g. in gallons/meter) and the present speed of the vehicle (e.g. in meters/second) may be provided to microprocessor 70 in sprayer subsystem 16 by base console 14 over bus 22. With the information received over bus 22, microprocessor 70 may then calculate a target rate (e.g. in gallons/second) which is equal to the desired application rate (in gallons/meter) multiplied by the speed of the vehicle (in meters/second).

Unlike the basic pressure mode, a target pressure is preferably calculated from the target rate and the known nozzle factor by a control equation:

$$\frac{\text{target}}{\text{pressure (psi)}} = \frac{[\text{target flow rate (gal/sec)}]^2}{[\text{nozzle factor} \times \text{delta nozzle factor}]^2}$$

where the nozzle factor is the constant representative of the number of nozzles, the size of the nozzles, the specific gravity, and the ratio of agent and carrier in sprayer subsystem 16.

Alternatively, the target rate itself may be utilized in a control equation, wherein an actual flow rate would be calculated from the measured pressure using the control equation:

*rate of flow (gal/sec)=nozzle factor×delta nozzle factor ×sqrt[pressure(psi)]*

One skilled in the art will appreciate that either the actual and target flow rates or the actual and target pressures may be compared using one of the control equations discussed above to provide an error determination thereof and generate the control signal for actuating servo valve 56 and maintaining the proper application rate of agent in sprayer subsystem 16. It will also be appreciated that information regarding the concentration of agent in carrier may be factored into the nozzle factor constant, or may be factored into the target and measured flow rate determinations, such that direct control over the delivery rate of the agent may be provided.

Recognizing that the nozzle factor in the above equations is purely an approximation of a theoretical number given the mechanical and physical variations which may occur over time in sprayer subsystem 16, a second factor (the "delta nozzle factor") is incorporated in the above control equations to provide a correction to the nozzle factor and compensate for the inaccuracies which may be found in the pressure responsive control feedback loop.

The delta nozzle factor will be close to 100% when the theoretical mechanical and physical assumptions of the sprayer subsystem 16 (e.g., nozzle size) are close to their actual values. However, should mechanical or physical deviations occur in the system (e.g., the nozzles wear), the delta nozzle factor will deviate from the 100% nominal value to correct the nozzle factor constant such that flow rate calculations more closely approximate the actual flow rates present in the system.

In the preferred hybrid mode, compensation through correction with the delta nozzle factor is preferably performed periodically by computing the percent error between the actual volume of flow measured by flowmeter 58 and the expected volume of flow calculated from the pressure measurements from pressure sensor 62. For example, the actual flow measured by the flowmeter may be calculated by counting a fixed number of pulses from the flowmeter (e.g., 1000), and determining the flow by dividing the number of pulses by the pulses per gallon constant for the particular flowmeter involved. Concurrently, an expected volume is accumulated based upon periodic calculations of flow using the pressure measurements from pressure sensor 62 during normal feedback control of sprayer subsystem 16. For example, the expected or theoretical flow may be accumulated at periodic intervals (e.g., 0.032 seconds in the preferred embodiment) according to the following equation:

$$\text{Theoretical flow} = \text{Theoretical flow} + (\text{nozzle factor} \times \sqrt{\text{pressure}}) \times 0.032\ sec$$

After the predetermined number of pulses of flowmeter 58 have occurred, the actual and theoretical flow values will be known, and the delta nozzle factor may be computed by the following equation:

$$\frac{\text{delta}}{\text{nozzle factor}} = \frac{\text{actual flow} - \text{theoretical flow}}{\text{theoretical flow}} \times 100\%$$

Consequently, an increase in the actual flow over the theoretical flow (e.g., resulting from wear on the nozzles) results in an increase in the delta nozzle factor. The increased delta nozzle factor then corrects the original theoretical nozzle factor (e.g., to factor in the wear on the nozzles) in the target pressure calculation described above so that the flow rate calculated from the pressure sensor better approximates the actual flow rate sensed by flowmeter 58.

The above-described compensation routine in the preferred hybrid mode is preferably run periodically in order to frequently recalculate the delta nozzle factor to compensate for mechanical or physical variations in sprayer subsystem 16. Further, this recalculation does not impede the response time of the control system since the primary feedback is still maintained using the measured pressure in sprayer subsystem 16.

Control over servo valve 56 is provided in much the same manner as the other modes of operation. The error between the actual pressure and the target pressure is determined by computing the target pressure as described above from the target rate, nozzle factor and delta nozzle factor, and generating a percent error between the actual and target pressures. Alternatively, the error may be determined by computing the error between the target rate and an actual flow rate calculation computed from the sensed pressure, nozzle factor and delta nozzle factor. The direction and amount of time to run the valve is calculated based upon the error determination, and the servo valve is actuated to correct the pressure in sprayer subsystem 16 to better approximate the target pressure (or correct the actual flow rate to better approximate the target flow rate). As noted above, known control feedback enhancement techniques may be utilized in order to provide faster and more stable responses in this closed-loop control system.

As in the other modes, measurements of actual flow rate and total volume of agent applied are provided to base console 14 for display to the operator. In the hybrid mode, flowmeter measurements are used to provide more accurate measurements of the actual flow rate and the total volume of agent dispensed across bus 22 to console 14 in order to display these values to the operator. As discussed above, both of these values may be easily computed from the pulsed signal provided by the flowmeter, given the known pulses per gallon of the flowmeter. Preferably, however, the actual flow rate provided to console 14 is an averaged value taken over several cycles, which provides more stable readings over time. Further, it will be appreciated that the actual flow rate and total volume values computed for display to the operator may utilize the same data as is used in the compensation routine discussed above.

Therefore, it will be appreciated that in the hybrid mode, the accuracy benefits of the flowmeter measurements are obtained without the usual drawbacks due to the relatively slow responses of flowmeters. Instead, primary feedback is still provided by the relatively responsive pressure sensor, while the compensation of the pressure responsive flow rate calculation and the measurement of the actual flow rate and the total volume may occur only periodically without affecting the overall response of the fluid delivery control system. Consequently, the hybrid mode is capable of incorporating the advantages of the pressure sensor and flowmeter into a responsive and accurate system for controlling fluid delivery, while minimizing the drawbacks which are typically associated with such devices.

While it would be possible to incorporate wholly separate operational routines for the flowmeter, pressure, and hybrid modes in ROM 72, it will be appreciated by one skilled in the art that for a fluid delivery control system utilizing one or more of the above-described modes, many of the common features of such modes may be provided in common subroutines (e.g., to minimize program space). As one example, calculation of the target pressure in the pressure and hybrid modes may be performed in the same subroutine, with the delta nozzle factor forced to a value of 100% in the pressure mode. Also, interrupts, handlers, and collateral functions such as serial communications and controlling the various valves in subsystem 16 may be shared in common subroutines. One skilled in the art will appreciate that many other duplicative functions between modes may be combined into common subroutines to minimize program space while providing the separate modes of the invention.

Logic Flow

FIGS. 4–9 are flowcharts showing the hybrid mode operation for the preferred fluid delivery control system consistent with the present invention. The code for the program flow shown in these flowcharts is stored in ROM 72 for execution by microprocessor 70.

Figure 4:
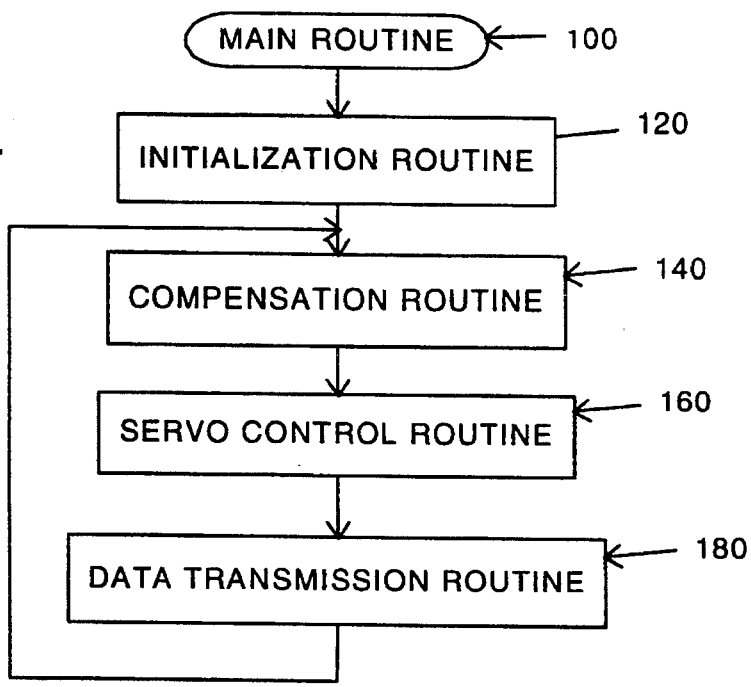
FIG. 4 is a flow chart of the primary program flow for the preferred fluid delivery control system of FIG. 3.

The overall operation of the code for executing the hybrid mode of the preferred fluid delivery control system is shown generally in FIG. 4. Upon startup, main routine 100 executes an initialization routine 120 which performs general housekeeping functions such as setting flags, downloading data from EEPROM 74, establishing communication over bus 22, enabling interrupts, etc. The operation of initialization routine 120 will vary depending upon the particular application, hardware, etc. utilized in the fluid delivery control system; however, regardless of the application, the code necessary to achieve proper initialization will be known to one skilled in the art.

Main routine 100 generally cycles between compensation routine 140, servo control routine 160 and data transmission routine 180. Other routines may also be utilized in the primary loop of main routine 100 to handle other functions of sprayer subsystem 16, such as controlling the boom solenoid valves, etc. In addition, many functions, including some of the functions in compensation routine 140, servo control routine 160 and data transmission routine 180 may be handled in separate subroutines or interrupt routines.

Turning first to FIGS. 8 and 9, the preferred fluid delivery control system utilizes interrupts for handling flowmeter 58 and pressure sensor 62. The flowmeter interrupt routine 200 seen in FIG. 8 is preferably initiated upon receipt of a pulse from flowmeter 58 at an interrupt request line on microprocessor 70. First, in block 202, the variable total count pulses is incremented. This variable is used to determine to total volume of agent delivered by the system since it was initialized. The total volume of agent may be computed by multiplying the total count pulses value by the pulse per gallon factor of flowmeter 58.

Next, in blocks 204–212, an average flowmeter period value is calculated for flowmeter 58. While the flow rate may be determined directly from measuring the elapsed time between pulses given a known pulses per gallon factor for the flowmeter, it has been found that more stable measurements may be obtained by averaging a number of period measurements over several cycles. Since the flow rate sensed by the flowmeter is not used as the primary feedback control in the hybrid mode, the reduced response time provided by averaging a number of measurements is not detrimental to the overall response of the system, and is offset by the increased stability in readings.

In block 204, a flowmeter period variable is obtained, which is equal to the elapsed time since the last pulse was received from flowmeter 58. This value is added in block 206 to a second variable, period time, which accumulates a number of flowmeter period readings over several cycles. The number of cycles being accumulated in period time is incremented in block 208. Each of the operations performed in blocks 204–208 is performed each time a pulse is received from flowmeter 58.

The average flowmeter period is calculated periodically in blocks 210 and 212. Block 210 performs an inquiry to see if the period time variable has accumulated up to a predetermined time frame, in this case 0.256 seconds. If it has, then block 212 is executed to compute the average flowmeter period. If not, then block 212 is bypassed and execution of the interrupt proceeds with block 214. The selection of the predetermined time frame will be dependent upon the desired update rate of the average flowmeter period determination, as well as the desired minimum number of periods which need to be averaged in order to provide adequately stable computations of the average flowmeter period. It has been found that for the particular preferred implementation described above, the period of 0.256 will provide timely and stable calculations over the range of flow rates seen in sprayer subsystem 16.

Alternatively, block 210 may check the number of cycles in which the period time has been accumulating. However, it has been found that a measurement of the total period is preferable since it provides new average period determinations at fixed intervals of time to the nearest whole cycle regardless of the flow rate of flowmeter 58, whereas the update period by at fixed cycles (or pulses of flowmeter 58) will vary depending upon the flow rate.

In block 212, the average flowmeter period is stored indirectly by storing the current period time and cycles values in average time and average cycles variables, respectively. Once stored, the period time and cycles variables are cleared so that a new average flowmeter period may be calculated in subsequent executions of flowmeter interrupt routine 200. It will be appreciated that the average flowmeter period may be directly calculated by dividing the average time by the average cycles, and that the actual flow rate may be directly calculated by taking the inverse of the product of the average flowmeter period and the pulses per gallon factor of flowmeter 58. These calculations are performed on an as-needed basis in other routines in the fluid delivery control system.

Finally, in block 214, flowmeter interrupt routine 200 increments a flow pulses value, which is utilized in compensation routine 140 to determine when to recompute the delta nozzle factor. The significance and use of this value will be discussed in greater detail below with respect to FIG. 5.

Pressure sensor interrupt routine 220 is shown in FIG. 9. This interrupt is preferably generated on a periodic basis (e.g. every 32 milliseconds) to recompute the pressure measurement from pressure sensor 62. This is performed in block 222. In addition, a pressure rate may also be computed, and both the pressure and pressure rate measurements may be provided to base console 14 over bus 22 by microprocessor 70.

It will be appreciated that the operations necessary to obtain measurements from pressure sensor 62 will vary depending upon the particular type of pressure sensor, as well as the type of conversion circuitry 63 utilized to provide a digital representation of the measured pressure. As discussed above, the preferred pressure sensor and conversion circuitry provide a pulsed output with timed pulses corresponding to the start time, the pressure, the pressure rate, a 3.0 v reference voltage, and a 2.5 reference voltage. The calculation of measured pressure and pressure rate from such circuitry is known in the art. Briefly, a separate interrupt (not shown) is tied to the pulsed output to capture the times in which these pulses are received, and pressure sensor interrupt 220 determines the periods of the pulses, calculates scaled values for the pressure and pressure rate, normalizes these values using the 3.0 v and 2.5 v reference voltages, subtracts out zero offsets determined in calibration, and provides the scaled and normalized measurements to the rest of the system. Various other mathematical calculations and operations may be performed to increase the accuracy of the measurements as will be appreciated by one skilled in the art.

Figure 7:
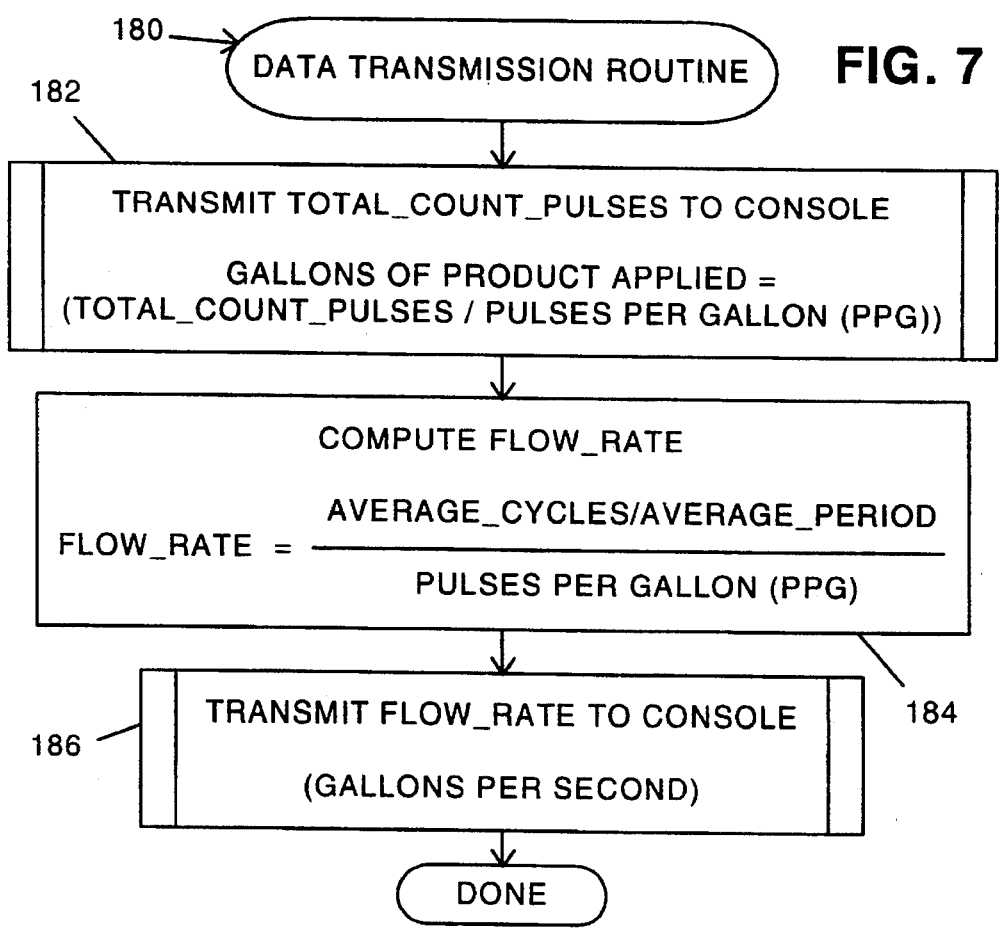
FIG. 7 is a chart of the data transmission routine of FIG. 4.
Figure 5:
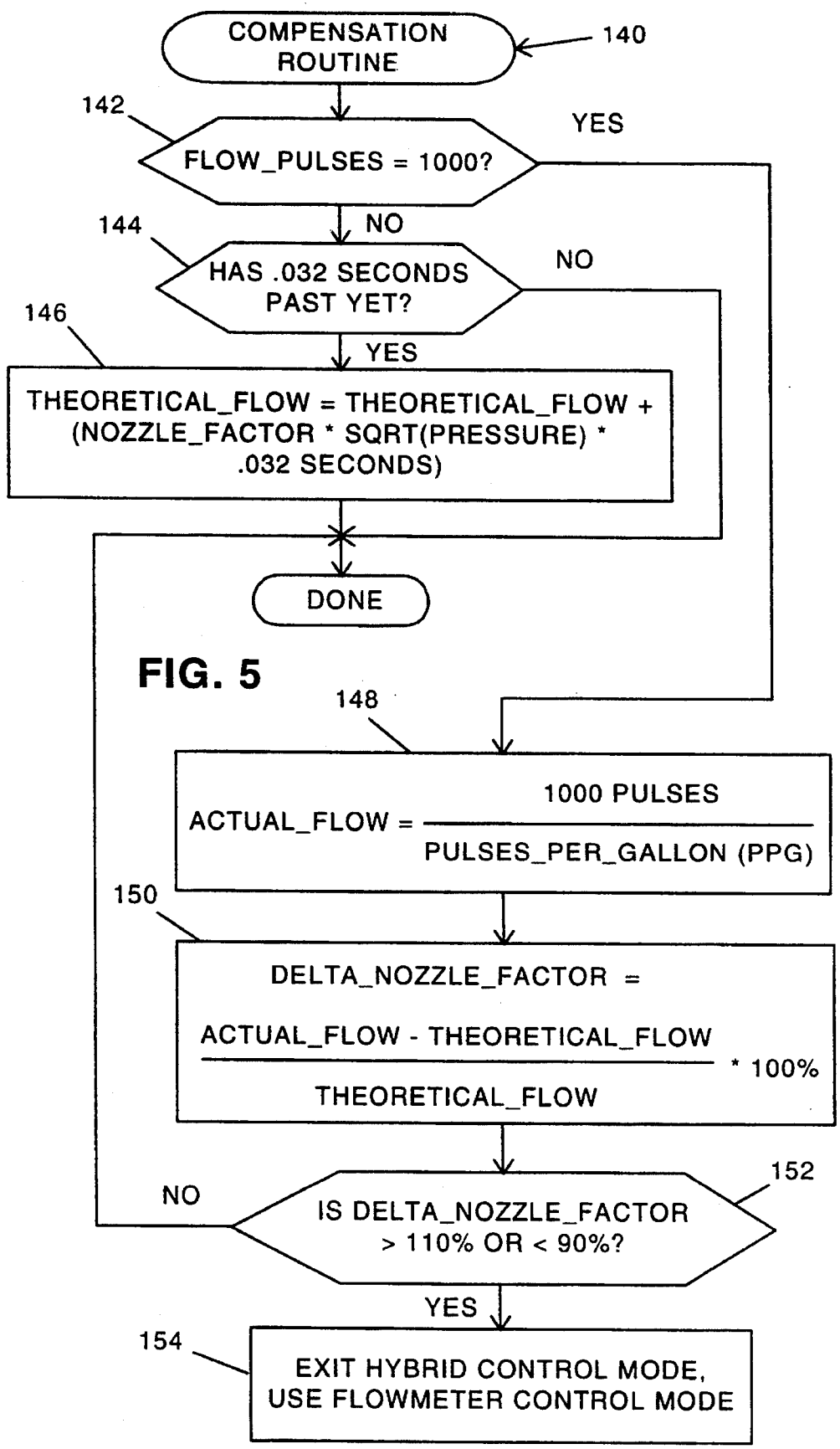
FIG. 5 is a flow chart of the compensation routine of FIG. 4.
Figure 6:
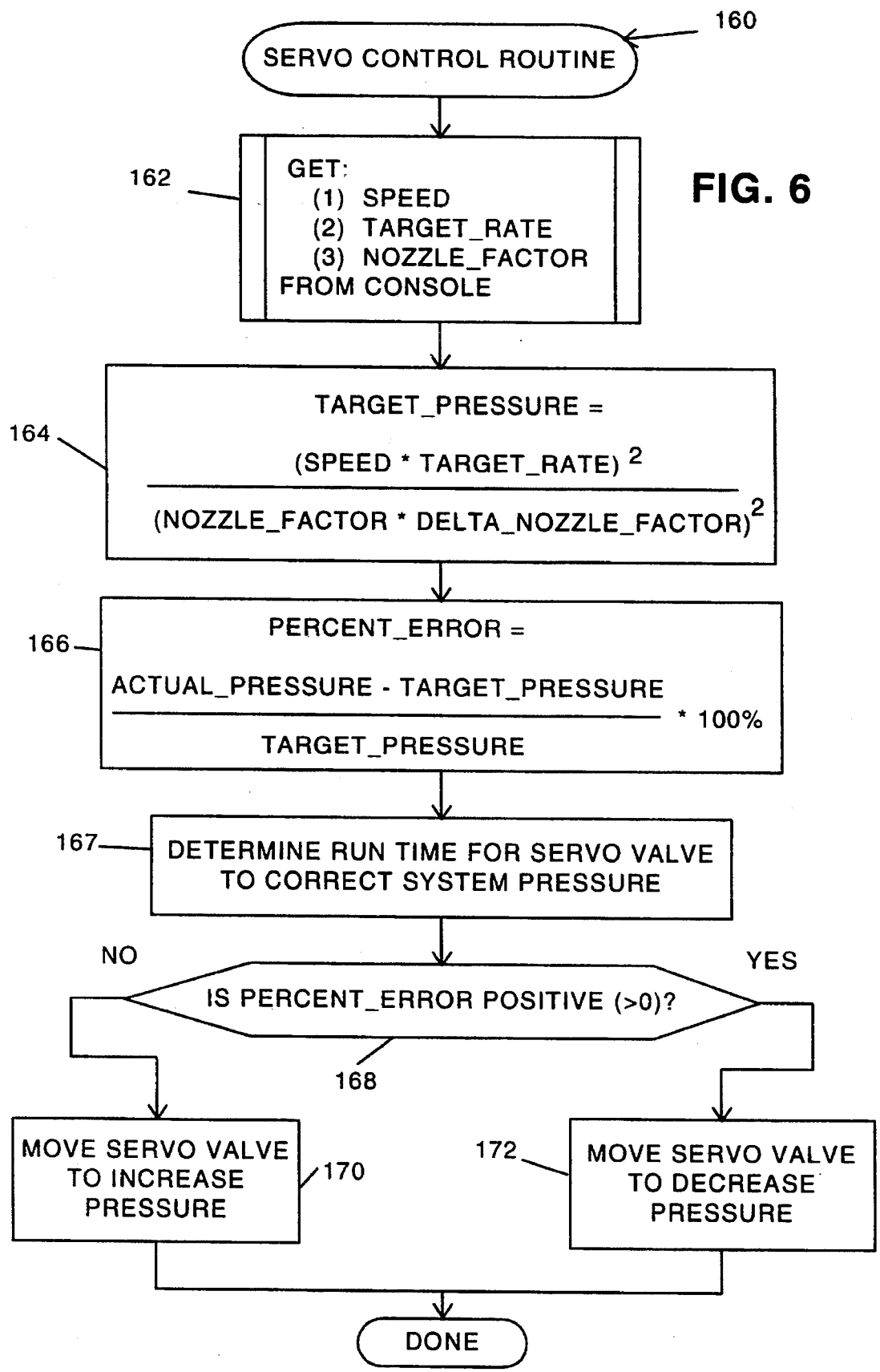
FIG. 6 is a flow chart of the servo control routine of FIG. 4.

Turning to FIGS. 5–7, the execution flow of main routine 100 will be discussed in greater detail. FIG. 5 shows the program flow of compensation routine 140. Compensation routine 140 is configured to compute a delta nozzle factor value in blocks 148 and 150 to provide a correction to the theoretical nozzle factor value used in the control equation which actuates servo valve 56 to control the delivery rate in sprayer subsystem 16.

Calculation of the delta nozzle factor is preferably performed after 1000 pulses have been transmitted by flowmeter 58. As discussed in relation to FIG. 8, flowmeter interrupt routine 200 increments a flow pulses counter upon each receipt of a pulse from flowmeter 58. Block 142 in compensation routine 140 checks this counter, and if 1000 pulses have occurred, transfers control to block 148 to perform the delta nozzle factor computation.

During accumulation of 1000 pulses from flowmeter 58, compensation routine 140 calculates a theoretical flow value based upon the pressure measurements taken by pressure sensor 62 during this time period. The accumulation of theoretical flow is performed at discrete time intervals in block 146 as follows. Block 144 checks to see if 0.032 seconds have elapsed since the last theoretical flow calculation. If not, then control is returned to main routine 100. If 0.032 seconds have elapsed, a predicted flow during the 0.032 second interval is calculated using the measured pressure and the known nozzle factor, which are related by the following equation:

$$\text{flow (0.032 sec)} = \text{nozzle factor} \times \text{sqrt(pressure)} \times 0.032 \text{ sec}$$

This calculation is accumulated for each time slice in a theoretical flow counter which runs during the period in which 1000 pulses of flowmeter 58 are accumulated. Therefore, after 1000 pulses of flowmeter 58 have been accumulated, a prediction of the total flow over the same period of time by the pressure measurements and theoretical nozzle factor is stored as the theoretical flow. The delta nozzle factor is not used in this equation, however, since it is desired to determine the absolute error in the pressure based calculations.

The delta nozzle factor correction is performed in blocks 148 and 150 whenever 1000 pulses are sensed by block 142. First, the actual flow over the 1000 pulses is calculated by dividing 1000 by the pulse per gallon rating of flowmeter 58. It will be appreciated that this calculation will be relatively accurate given the accuracy of flowmeter 58. It will also be appreciated that the theoretical flow over this same period has been accumulated in block 146. Therefore, in block 150, delta nozzle factor may be calculated from the percent difference from the actual and theoretical flows determined from the flowmeter 58 and pressure sensor 62, respectively, by the equation:

$$\frac{\text{delta}}{\text{nozzle factor}} = \frac{\text{actual flow} - \text{theoretical flow}}{\text{theoretical flow}} * 100\%$$

The delta nozzle factor, once calculated, may also be averaged with the last computed value to reduce the effects of possible transient changes in the system. Further, it will be appreciated that after calculation of the delta nozzle factor, the theoretical flow value and the flow pulses counter will be cleared to enable compensation routine 140 to begin to recompute the delta nozzle factor.

A further operation may be performed in compensation routine 140 to detect when the actual and predicted flow rates have deviated past a permissible range of error. In block 152, it is determined whether the delta nozzle factor is outside of a +/−10% deviation. If not, then control returns to main routine 100 for operation in the hybrid mode. However, if the delta nozzle factor has exceeded this range, block 154 forces the fluid delivery control system into a flowmeter control mode as it assumes that the calculations provided with the pressure sensor are outside of a permissible range of accuracy and may therefore not provide adequate control over sprayer subsystem 16. This may occur, for example, if the nozzles wear past a permissible point. It is contemplated that the sprayer subsystem would need to be checked and fixed (e.g. the nozzles replaced) in order to return control to the hybrid mode.

In some applications, it may be desirable to inhibit the calculation of a new delta nozzle factor under certain circumstances. For example, if the fluid delivery control system is operating the boom solenoid valves (which may create noise that degrades pressure measurements), if all of the boom solenoid valves are closed, if the sprayer subsystem is placed on hold, or if the application rate is below a minimum flow rate, etc., then the calculation of delta nozzle factor would need to be inhibited to prevent erroneous calculations from occurring.

FIG. 6 shows the preferred servo control routine 160 for controlling the operation of servo valve 56 and regulate the pressure and application rate in sprayer subsystem 16. First, in block 162, the vehicle speed, the target application rate, and the nozzle factor for sprayer subsystem 16 are obtained from base console 14 over bus 22. Preferably, this operation is performed in a separate serial communications interrupt routine, but is shown in FIG. 6 for ease of understanding. Further, as discussed above, the information received from console 14 may be maintained or stored by sprayer subsystem 16 rather than relying on base console 14 if desired. In particular, the nozzle factor for sprayer subsystem 14 may be stored in EEPROM 74 as this value will preferably not change once the sprayer subsystem is calibrated.

Next, in block 164, the target pressure is calculated by the following equation which utilizes the correction provided by the delta nozzle factor:

$$\frac{\text{target}}{\text{pressure (psi)}} = \frac{[\text{target flow rate (gal/sec)}]^2}{[\text{nozzle factor} * \text{delta nozzle factor}]^2}$$

The percent error between the target pressure determined above and the actual pressure sensed by pressure sensor 62 (and computed by pressure sensor interrupt 220) is then calculated in block 166 using the equation:

$$\text{Percent error} = \frac{\text{actual pressure} - \text{target pressure}}{\text{target pressure}} * 100\%$$

Next, in block 167, the run time and direction for actuating servo valve 56 is computed using conventional control techniques for improving response time while preventing overshoot and hunting, etc. Further, the run time is computed to keep the flow above a certain minimum flow (regardless of speed), and to keep the servo valve from attempting to open or close beyond its end stops. The operation of block 167 will vary depending upon the configuration of servo valve 56, as well as the desired response time of the control system. The use of such control techniques for improving the feedback control of sprayer subsystem 16 is well known in the art.

Next, in block 168, the percent error is analyzed to determine whether servo valve must be opened or closed to alter the pressure in sprayer subsystem 16. If the percent error is negative (i.e. the actual pressure is below the target pressure), then block 170 is executed to close servo valve 56 for the period of the run time selected to increase pressure applied to the nozzles. If the percent error is positive, then block 172 is executed to open servo valve 56 for the period of the run time selected to decrease the pressure applied to the nozzles.

It will be appreciated that since the preferred servo valve 56 is of the type in which rotation is provided by applying a positive or negative control signal thereto, blocks 170 and 172 may also be performed in separate interrupt routines which apply the desired voltage for the length of time specified in block 167. It will also be appreciated that, rather than comparing target and actual pressures, control may be provided by comparing target and actual flow rates, in the manner which was discussed previously.

FIG. 7 shows the data transmission routine 180 which communicates with console 14 over bus 22. First, in this routine, the total count pulses are transmitted to console 14 over bus 22. The total count pulses are accumulated in flowmeter interrupt routine 200, and, by dividing the number of pulses by the pulses per gallon rating of the flowmeter, are representative of the total volume of agent which has been dispensed by sprayer subsystem 16.

Next, in block 184, the actual flow rate as determined by flowmeter 58 is computed. As discussed above in relation to FIG. 8, average flowmeter period and average cycle values are maintained which represent the average of flow rates measured by flowmeter 58. The frequency of the pulses may be calculated by dividing the average cycles by the average period, then the actual flow rate measured by flowmeter 58 may be computed by dividing the frequency of pulses by the pulses per gallon rating of flowmeter 58. This value is transmitted in block 186 over bus 22 to console 14 for display to the operator.

It will be appreciated that the communication with console 14 over bus 22 in blocks 182 and 186 is preferably performed in separate serial interrupt routines. However, these routines have been included as shown in FIG. 7 to facilitate understanding of the operation of the preferred fluid delivery control system.

Consequently, the program flow of the preferred fluid delivery control system which is shown in FIGS. 4–9 provides fast and accurate control over sprayer subsystem 16. In particular, the response benefits of pressure feedback and the accuracy benefits of flowmeter measurements are combined to provide increased response and accuracy over conventional fluid delivery control systems. In addition, the drawbacks commonly associated with pressure sensors and flowmeters are effectively diminished through the use of the preferred control system.

Various changes and modifications may be made without departing from the spirit and scope of the present invention. For example, it will be appreciated that, in embodiments of the fluid delivery control system which are selectable between flowmeter, pressure, and hybrid modes, a single servo control routine similar to that shown in FIG. 6 may be utilized to perform control under any mode. In such an embodiment, the percent error computation would vary depending upon the mode in which the fluid delivery control system was operating. In the hybrid mode, the routine would follow the general flow as is shown in FIG. 6. In the pressure mode, the same general flow may be followed, except using the delta nozzle factor forced to 100% (i.e. no correction). Finally, in the flowmeter mode, the percent error may be determined as discussed above by comparing the actual flow rate measured by the flowmeter with the target flow rate received from console 14. One skilled in the art would appreciate the modifications to FIG. 6 which would be necessary to enable multiple mode control over sprayer subsystem 16.

The present invention therefore provides a fluid delivery control system which exhibits increased response and accuracy over convention control systems. As one skilled in the art will appreciate that various modifications may be made to the preferred embodiments without departing from the spirit and scope of the invention, the invention thus resides in the claims hereafter appended.

We claim:

1. A fluid delivery system for delivering a fluid to an output at a target flow rate, comprising:
    (a) delivery means for providing a fluid under pressure to an output, the delivery means being controllable to deliver the fluid at a plurality of delivery rates;
    (b) a pressure sensor configured to provide a pressure signal representative of fluid pressure in the delivery means;
    (c) a flowmeter configured to provide a flow rate signal representative of fluid flow rate in the delivery means;
    (d) control means, responsive to the pressure signal, for controlling the delivery means to deliver fluid to the output at the target flow rate, wherein the target flow rate and the pressure signal are related by a control equation having a compensation factor; and
    (e) compensation means for controlling the compensation factor to vary the responsiveness of the control equation in response to deviations between a flow rate value calculated from the pressure signal and a flow rate value measured from the flow rate signal.

2. The fluid delivery system of claim 1, wherein the control means includes means for comparing the pressure signal with a target pressure computed from the target flow rate.

3. The delivery system of claim 1, wherein the flowmeter provides a pulsed output signal representative of the flow rate in the delivery means, whereby flow rate is a function of the period of the pulsed output signal.

4. The delivery system of claim 1, wherein the pressure sensor provides an analog voltage representative of the pressure in the delivery means, and wherein the control means further comprises analog-to-digital conversion means for providing a digital representation of the analog voltage from the pressure sensor.

5. A fluid delivery system for delivering a fluid to an output at a target flow rate, comprising:
    (a) delivery means for providing a fluid under pressure to an output the delivery means being controllable to deliver the fluid at a plurality of delivery rates;
    (b) a pressure sensor configured to provide a pressure signal representative of fluid pressure in the delivery means:
    (c) a flowmeter configured to provide a flow rate signal representative of fluid flow rate in the delivery means:
    (d) control means, responsive the pressure signal, for controlling the delivery means to deliver fluid to the output at the target flow rate by comparing the pressure signal with a target pressure computed from the target flow rate, wherein the target flow rate and the pressure signal are related by a control equation, wherein the target pressure is related to the target flow rate by the equation:

$$\text{target pressure} = \frac{[\text{target flow rate}]^2}{[\text{nozzle factor} * \text{delta nozzle factor}]^2};$$

wherein the nozzle factor is a constant representative of the relationship between flow rate and the square root of pressure in the delivery means, and wherein the delta nozzle factor is representative of an error in the nozzle factor; and
    (e) compensation means for controlling the delta nozzle factor to vary the responsiveness of the control equation in response to deviations between a flow rate value calculated from the pressure signal and a flow rate value measured from the flow rate signal.

6. The fluid delivery system of claim 5, wherein the compensation means includes:
    (a) means for calculating an actual volume from the flow rate signal, wherein the actual volume is representative of the volume of fluid delivered by the delivery means during a first period;
    (b) means for calculating a predicted volume from the pressure signal, wherein the predicted volume is representative of the nozzle factor and a plurality of pressure measurements by the pressure sensor during the first period; and
    (c) means for computing percent error between the actual volume and the predicted volume, wherein the delta nozzle factor is representative of the percent error.

7. The delivery system of claim 6, wherein the means for calculating a predicted volume comprises means for summing a plurality of volume calculations computed at evenly-spaced time intervals, wherein each volume calculation is representative of the pressure signal by the equation:

$$\textit{volume} = \textit{nozzle factor} \times \textit{sqrt(pressure)} \times \textit{time interval.}$$

8. The delivery system of claim 6, wherein the compensation means further comprises means for forcing the control means into a flowmeter-responsive mode in which the control means is responsive to the flow rate signal, rather than the pressure signal, when the percent error between the actual volume and the predicted volume exceeds a predetermined value.

9. The delivery system of claim 5, wherein the delivery system is disposed on a sprayer assembly operatively configured to be movable at a plurality of speeds to apply a fluid over a surface, wherein the control means further comprises means for varying the target flow rate responsive to the speed of the sprayer assembly to provide a substantially constant application rate of fluid over the surface.

10. The delivery system of claim 9, further comprising communications means for communicating with a base console unit, wherein:
 (a) the communications means receives the speed, a desired application rate representative of the target rate and a width of application of fluid on the surface, and the nozzle factor from the base console; and
 (b) the communication means transmits a total volume of fluid calculation and a current application rate calculation, each of which is representative of the flow rate signal, to the base console.

11. The delivery system of claim 10, further comprising means for averaging a plurality of flow rate measurements from the flowmeter to compute the current application rate calculation.

12. A fluid delivery system for delivering a fluid to an output at a target flow rate, comprising;
 (a) delivery means for providing a fluid under pressure to an output, the delivery means being controllable to deliver the fluid at a plurality of delivery rates;
 (b) a pressure sensor configured to provide a pressure signal representative of fluid pressure in the delivery means;
 (c) a flowmeter configured to provide a flow rate signal representative of fluid flow rate in the delivery means;
 (d) control means, responsive to the pressure signal, for controlling the delivery means to deliver fluid to the output at the target flow rate by comparing the pressure signal with a target pressure commuted from the target flow rate, wherein the target flow rate and the pressure signal are related by a control equation having a compensation factor, and wherein the control means includes:
  (1) means for computing the percent error between the target pressure and the pressure signal from the pressure sensor; and
  (2regulating means for regulating pressure in the delivery means responsive to the percent error between the target pressure and the pressure signal; and
 (e) compensation means for controlling the compensation factor to vary the responsiveness of the control equation in response to deviations between a flow rate value calculated from the pressure signal and a flow rate value measured from the flow rate signal.

13. The delivery system of claim 12, wherein the delivery means further comprises a servo valve operatively connected to control pressure in the delivery means, and wherein the regulating means comprises means for actuating the servo valve in a selected direction for a calculated period of time to further open or close the servo valve.

14. A sprayer control system for controlling a sprayer delivery system to deliver an agent from a source of agent to an output at a target application rate, wherein the sprayer delivery system is of the type which is controllable to provide an agent under pressure at a plurality of delivery rates, the sprayer control system comprising:
 (a) pressure sensing means for providing a pressure signal representative of agent pressure in the sprayer delivery system;
 (b) flow rate sensing means for providing a flow rate signal representative of agent flow rate in the sprayer delivery system;
 (c) control means for controlling the sprayer delivery system to deliver agent at the target application rate, wherein the control means includes error determining means, responsive to the pressure signal, for determining error between a flow rate sensed by the pressure sensing means and the target application rate; and
 (d) compensation means, responsive to the flow rate signal, for varying the responsiveness of the error determining means to the pressure signal, to compensate for variations between the flow rate sensed by the pressure sensing means and an actual flow rate sensed by the flow rate sensing means.

15. The sprayer control system of claim 14, wherein:
 (a) the flow rate sensed by the pressure sensing means is related to the pressure sensed by the pressure sensing means by a nozzle factor constant which is representative of the relationship between flow rate and the square root of pressure in the sprayer delivery system; and
 (b) the compensation means further comprises means for adjusting the nozzle factor constant responsive to an error between actual flow measured by the flow rate sensing means during a first period and a theoretical flow calculated from the pressure signal throughout the first period.

16. The sprayer control system of claim 14, wherein the sprayer delivery system is disposed on a sprayer assembly operatively configured to be movable at a plurality of speeds to apply agent over a surface, wherein the control means further comprises means for varying the target application rate responsive to the speed of the sprayer assembly to provide a substantially constant application rate of agent over the surface.

17. A method for controlling a delivery system to deliver a fluid to an output at a target flow rate, wherein the delivery system is of the type which is controllable to provide a fluid under pressure at a plurality of delivery rates, the method comprising the steps of:
 (a) sensing fluid pressure in the delivery system and providing a pressure signal representative thereof;
 (b) sensing fluid flow rate in the delivery system and providing a flow rate signal representative thereof;
 (c) controlling the delivery system to deliver fluid at the target flow rate responsive to the pressure signal, wherein the target flow rate and pressure signal are related by a control equation; and
 (d) varying the responsiveness of the control equation responsive to the flow rate signal to compensate for variations between a flow rate value calculated from the pressure signal and the actual flow rate determined from the flow rate signal.

18. A method for controlling a delivery system to deliver a fluid to an output at a target flow rate, wherein the delivery system is of the type which is controllable to provide a fluid under pressure at a plurality of delivery rates, the method comprising the steps of:
 (a) sensing fluid pressure in the delivery system and providing a pressure signal representative thereof;

(b) sensing fluid flow rate in the delivery system and providing a flow rate signal representative thereof;

(c) controlling the delivery system to deliver fluid at the target flow rate responsive to the pressure signal, wherein the target flow rate and pressure signal are related by a control equation, the controlling step including the steps of:

(1) comparing the pressure signal with a target pressure, wherein the target pressure is computed from the target flow rate using the control equation, the control equation having a nozzle factor constant representative of the relationship between flow rate and the square root of pressure in the delivery system, and a delta nozzle factor representative of error in the nozzle factor;

(2) computing the percent error between the target pressure and the pressure signal from the pressure sensor; and (3) regulating pressure in the delivery system responsive to the percent error between the target pressure and the pressure signal; and (d) varying the responsiveness of the control equation responsive to the flow rate signal to compensate for variations between a flow rate value calculated from the pressure signal and the actual flow rate determined from the flow rate signal.

19. The method of claim 18, wherein the varying step comprises the steps of:

(a) calculating an actual volume from the flow rate signal, wherein the actual volume is representative of the volume of fluid delivered by the delivery system during a first period;

(b) calculating a predicted volume from the pressure signal, wherein the predicted volume is representative of the nozzle factor and a plurality of pressure measurements by the pressure sensor during the first period; and (c) computing the delta nozzle factor which is representative of the percent error between the actual volume and the predicted volume.

20. The method of claim 19, wherein the delivery system is disposed on a sprayer assembly operatively configured to be movable at a plurality of speeds to apply a fluid over a surface, and wherein the method further comprises the step of varying the target flow rate responsive to the speed of the sprayer assembly to provide a substantially constant application rate of fluid over the surface.

21. A fluid delivery control system for controlling a delivery system to deliver a fluid to an output at a target flow rate, wherein the delivery system is of the type which is controllable to provide a fluid under pressure at a plurality of delivery rates, the fluid delivery control system comprising:

(a) a pressure sensor for providing a pressure signal representative of fluid pressure in the delivery system;

(b) a flowmeter for providing a flow rate signal representative of flow rate in the delivery system; and (c) a controller operatively connected to receive the pressure and flow rate signals, for controlling the delivery system to deliver fluid at the target flow rate, wherein the controller is configurable to operate in pressure, flowmeter and hybrid modes, and wherein:

(1) in the pressure mode, the controller is configured to control the delivery system to deliver fluid at the target flow rate responsive to the pressure signal;

(2) in the flowmeter mode, tho controller is configured to control the delivery system to deliver fluid at the target flow rate responsive to the flow rate signal; and (3) in the hybrid mode, the controller is configured to control the delivery system to deliver fluid at the target flow rate responsive to both the pressure and flow rate signals, wherein in the hybrid mode the controller comprises:

(i) control means, responsive to the pressure signal, for controlling the delivery system to deliver fluid at the target flow rate according to a control equation defining a relationship between the target flow rate and the pressure signal; and (ii) compensation means for varying the responsiveness of the control equation responsive to the flow rate signal to compensate for deviations between a flow rate value calculated from the pressure signal and a flow rate value measured from the flow rate signal.

* * * * *